May 16, 1944.  J. KOLBE  2,349,175
MOTOR VEHICLE
Filed Feb. 17, 1941   5 Sheets-Sheet 2
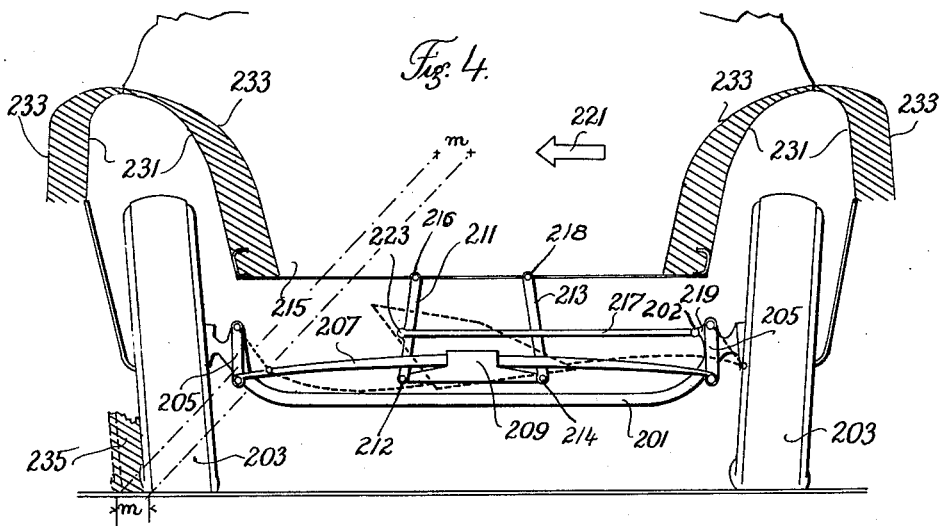
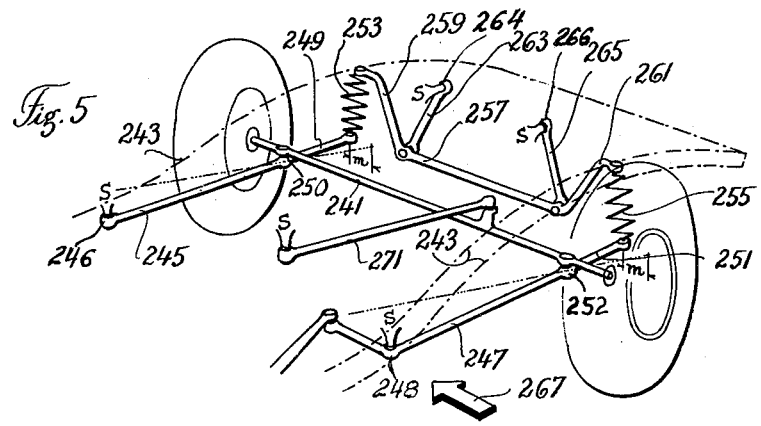
INVENTOR.
Joachim Kolbe
BY
ATTORNEY

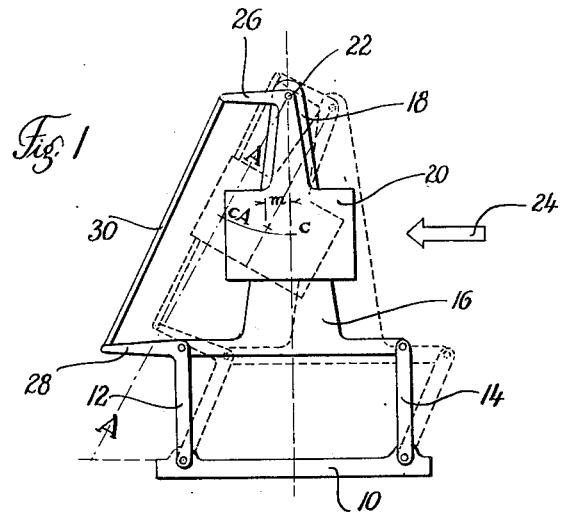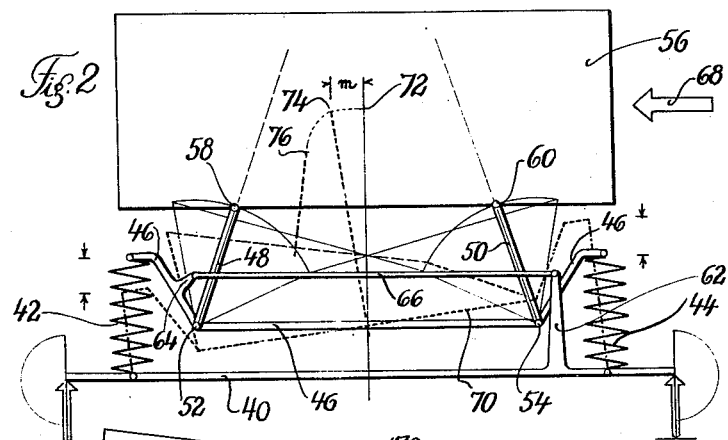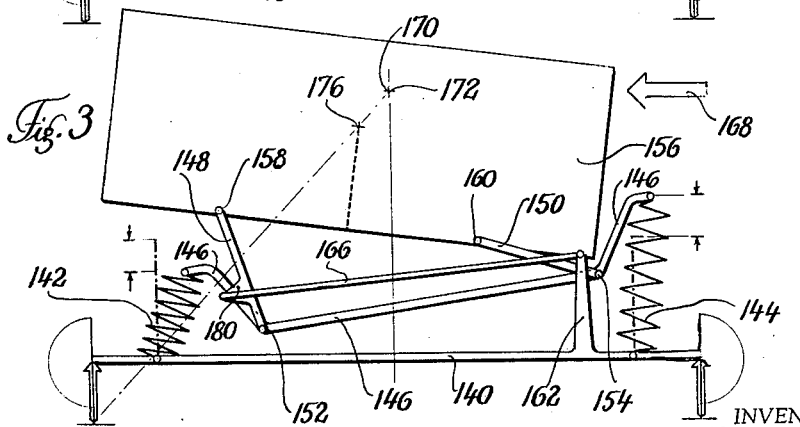

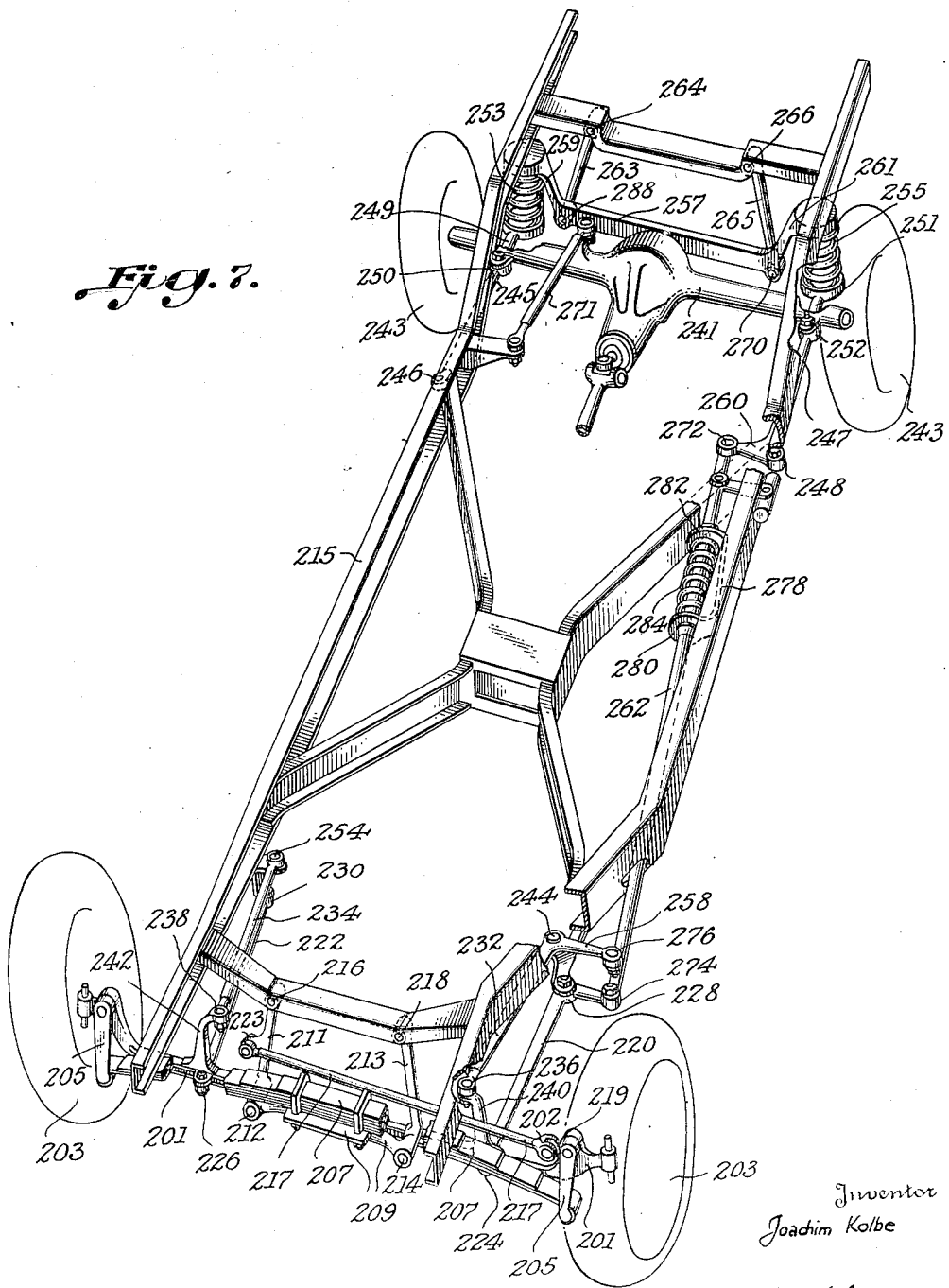

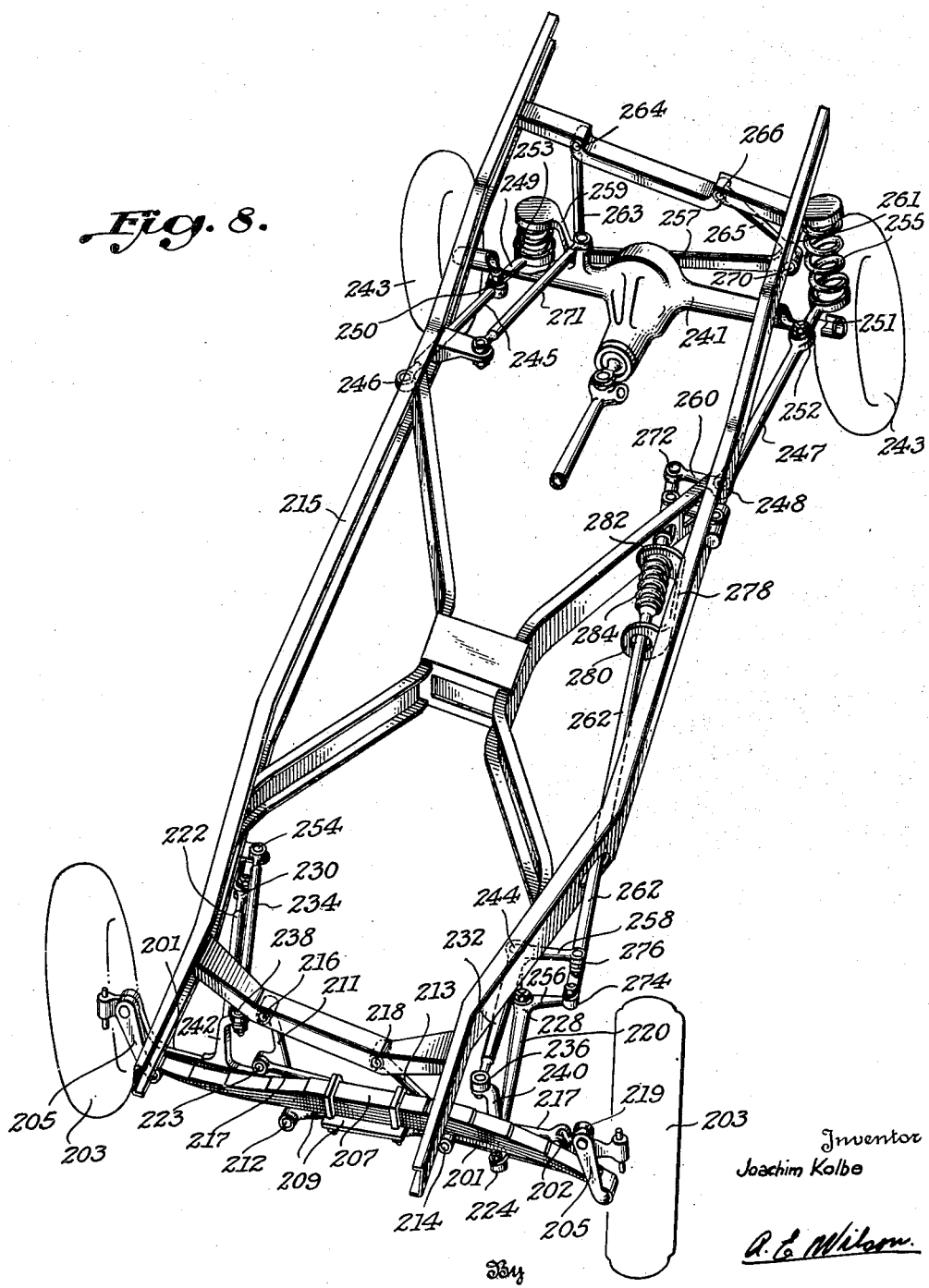

Patented May 16, 1944

2,349,175

UNITED STATES PATENT OFFICE 2,349,175

MOTOR VEHICLE

Joachim Kolbe, Detroit, Mich.

Application February 17, 1941, Serial No. 379,148

14 Claims. (Cl. 280—124)

This invention relates to vehicles and more particularly to motor vehicles having their bodies or superstructures so mounted on the wheel supporting means that the body may assume a banked or angularly inclined position as the vehicle rounds a curve.

It is known to mount the body of a vehicle in such a manner on the wheel supporting means that it moves to a banked position as the vehicle rounds a curve under the influence of the force exerted by some control mechanism such for example as the steering mechanism or any other source of power. Possibly the most desirable arrangement for moving the body into an angularly inclined or banked position includes the idea of so mounting the superstructure on the wheel supporting means that a center of motion positioned above the normal center of gravity of the superstructure or body is provided in such a manner that the center of gravity of the superstructure may move laterally towards the outside of the curve as the superstructure assumes the banked position.

In modern vehicles where springs are employed to absorb vertical shocks to which the wheels are subjected, it is common knowledge that a lateral shifting of the superstructure towards the outside of the curve takes place above the springs due to the increase of the load on the springs on the outside of the curve and a decrease of the load on the springs on the inside of the curve. This lateral shifting takes place in all vehicles whether they embody a banking device or not. In those vehicles which embody a banking effect accompanied by a lateral shifting of the center of gravity towards the outside of the curve, this lateral displacement coupled with the lateral shifting of the superstructure above the springs results in excessive and undesirable lateral movement. The effect of this excessive lateral displacement is that the useful space available for the passenger compartment, the engine and other necessary incidental features of the vehicle is materially reduced. The fenders must also be of undesirably large width in order to avoid striking the wheels. These features materially add to the cost of manufacturing the car and reduce the efficiency of the vehicle.

An object of this invention is to provide an improved connection between wheel supporting means and the superstructure of a motor vehicle whereby the lateral displacement of the body above the springs may be counteracted.

A further object resides in the provision of a novel and improved mounting for the body of a motor vehicle whereby the body is free to shift laterally in the direction of a lateral force to an inclined or banked position and wherein means are provided to prevent lateral displacement of the center of gravity of the body above the springs.

Still another object is to provide means to substantially eliminate lateral displacement of the body or superstructure of a motor vehicle above the springs.

A further object of this invention is to provide a vehicle having a body so mounted on the wheel supporting means that as the vehicle rounds curves and is subjected to centrifugal force the body moves laterally and downwardly to a new position to in effect increase the tread width of the vehicle.

Yet a still further object is to provide a body mounting arrangement for a motor vehicle whereby the body is mounted on angularly inclined links operably connected to the wheel supporting means in such a manner that the links are restrained from lateral shifting above springs interposed between the wheel supporting means and links and the body is free to shift laterally on the links to assume an angularly inclined position accompanied by a downward movement of the center of gravity of the body.

Another object of this invention is to provide a supporting member for link or guiding systems which permit banking of the superstructure under the influence of centrifugal force, wherein the supporting member is so mounted that it is shifted laterally towards the inside of the curve as the superstructure is urged laterally on the links towards the outside of the curve to assume a banked or angularly inclined position.

Still another object resides in the provision of laterally movable spring supporting members interposed between superstructure and wheel supporting means whereby lateral movement due to deflection of the springs under the influence of centrifugal force is compensated.

Another object resides in the provision of a spring support member whereby the spring is moved laterally towards the inside of a curve as the superstructure of the vehicle is subjected to centrifugal force tending to move it towards the outside of the curve.

A further object of this invention is to provide means operably connected to the wheel supporting means of a motor vehicle to move angularly inclined links laterally towards the inside of the curve as the superstructure of the vehicle shifts laterally on the links towards the outside of the curve to assume a banked or angularly inclined position.

Still another object resides in the provision of means extending longitudinally of the vehicle to shift a body supporting member towards the inside of a curve to partially compensate lateral displacement of the superstructure towards the outside of the curve as it moves to a banked position.

Another object is to provide generally transversely extending members interposed between banking device supporting members and longitudinally extending means to shift body supporting members towards the inside of a curve to partially compensate lateral displacement of the body towards the outside of the curve as it moves to a banked position.

Still a further object is to provide wheel supporting means having means associated therewith to compensate lateral displacement of the superstructure effected by deflection of the springs.

Other objects and advantages of this invention will be apparent from the following detailed description, considered in connection with the accompanying drawings, submitted for the purpose of illustration only and not intended to define the scope of the invention, reference being had for that purpose to the subjoined claims.

In the drawings

Figure 1 is a diagrammatic view illustrating the principles involved in the application of the invention to motor vehicles.

Figure 2 is a diagrammatic view illustrating the operation of a vehicle banking device which does not incorporate the present invention.

Figure 3 is a view similar to Figure 2 illustrating a vehicle embodying this invention shown in an operated position.

Figure 4 is a sectional view of a vehicle embodying a modified form of the invention adapted to be used with a vehicle front axle and shown embodied in the structure of Figs. 7 and 8.

Figure 5 is a perspective view illustrating a further modified form of the invention adapted to be used with a vehicle rear axle and shown embodied in the structure of Figs. 7 and 8.

Figure 7 is a perspective view illustrating a complete vehicle embodying the structures illustrated in Figures 4 and 5.

Figure 8 is also a perspective view showing the vehicle of Figure 7 in the operated or angularly inclined position.

Figure 6:
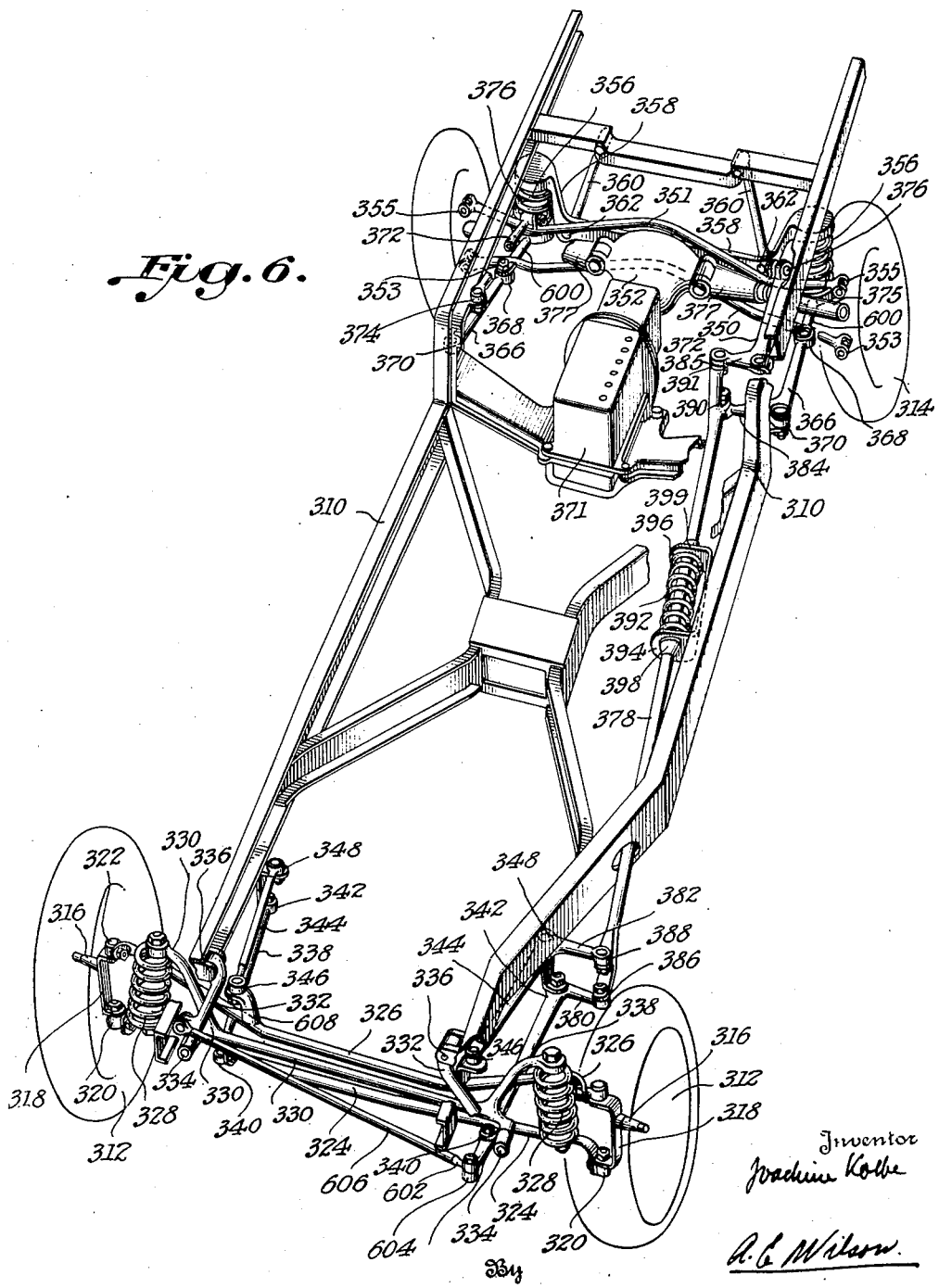
Fig. 6 is a perspective view of a vehicle embodying in a still further modified form the invention.

Before explaining in detail the present invention it is to be understood that the invention is not limited in its application to the details of construction and arrangements of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the diagrammatic view, Figure 1, it will be observed that the structure therein disclosed illustrates the principle of operation of the invention. A support member 10 which may correspond with the wheel supporting means or axle of a vehicle is provided with a pair of link members 12 and 14 pivotally connected thereto and pivotally connected to a saddle 16. The saddle 16 has an upwardly directed arm 18 to which a body, as illustrated by a pendulum 20 may be pivotally mounted at 22. All pivotal connections referred to in Figure 1 as well as in Figures 2 to 4 may be considered as having their axes in the longitudinal direction of the assumed vehicle.

Assuming that a force is exerted as indicated by the arrow 24 on the pendulum 20, and the links 12 and 14 are entirely restrained from lateral movement, and assuming that rod 30 is not connected to pendulum 20, the pendulum 20 will assume the position "A—A" swinging about the point of connection 22 between the pendulum and the arm 18. It will be observed that the center of gravity of the pendulum will move from c to cA into the axis "A—A," thereby moving said center of gravity an undesirable lateral distance. If now the body is interconnected with the supporting links 12 and 14 as by a rod 30, it is possible to compensate a portion of the lateral displacement of the center of gravity of the body 20 without reducing its angular inclination.

One desirable form of interconnecting the body 20 with the connecting links 12 and 14 comprises an arm 26 carried by the body or pendulum 20 and an arm 28 carried by one of the links 12 or 14. The arms 26 and 28 are pivotally connected with the rod 30 in such a manner that as the body 20 moves laterally under the influence of the force 24 the arm 26 exerts a lifting force on the rod 30 to elevate the arm 28 thereby moving the link member 12 angularly towards the dotted line position. The saddle 16 shifts laterally against the force 24 and transmits movement of the support link 12 to the support link 14.

The body or pendulum 20 thus assumes the same angular inclination as in the instance pointed out above. However, the lateral displacement in the direction of the force 24 is reduced by an amount equal to the lateral displacement of the saddle 16 against the direction of the force 24.

This action is assured by reason of the fact that the part referred to as the body 20 represents the full weight of the superstructure of a car including frame, engine and body, but the part referred to as the base 16 represents only the connecting portions between the superstructure of the vehicle and the supporting members therefor, weighing only a few pounds. Attention is called to the fact that since the body 20 is suspended as a pendulum with an effective length C—22, the center of gravity C of the pendulum therefore moves upwardly as it swings outwardly and maintains the entire apparatus in equilibrium so long as the upward movement of the center of gravity C of the body 20 is greater than the downward movement of the base 16 by angular movement of the links 12 and 14.

Since the superstructure is mounted as a pendulum wherein the force of gravity will return it to a neutral position, no springs are necessary to return the superstructure to the normal or upright position.

If a vehicle having a body 20 pivotally mounted at 22 on wheel supporting means is subjected to centrifugal force 24 the body 20 will shift laterally in the direction of said force and the linkage 26, 28 and 30 will move the base 16 against the direction of the centrifugal force thereby partially compensating lateral displacement, while at the same time permitting the body 20 to assume the full desired angular inclination.

Referring now to Figure 2 illustrating the operation of a vehicle banking device not embodying the present invention, it will be observed that an axle or wheel supporting means 40 of a motor vehicle may be provided with resilient means such for example as springs 42 and 44 suitably attached thereto. It will be understood that the wheel supporting means 40 may take any desired form such for example as independent suspension, rigid axle, etc. A member or saddle 46 may be pivotally connected to the upper ends of the springs 42 and 44. The saddle 46 forms a support for angularly inclined link members 48 and 50, suitably connected to the saddle 46 by hinge connections with their axes extending longitudinally of the vehicle at 52 and 54 respectively, and connected in the same manner to a superstructure or body 56 of the vehicle at 58 and 60 respectively by means of precompressed resilient bushings 57 and 59 which tend to maintain the superstructure in a substantially predetermined position as more clearly disclosed in Kolbe Patent No. 2,226,435.

An arm 62 carried by the wheel supporting means 40 may be interconnected with a portion 64 of the saddle 46 by a rod 66 having pivotal connections whose axes extend longitudinally of the vehicle. This interconnection between the wheel supporting means and saddle assures proper vertical movement of the springs relative to the wheel supporting means and avoids lateral movement of the saddle 46 relative to the wheel supporting means 40.

Assuming now the superstructure 56 is subjected to lateral or centrifugal force in the direction of the arrow 68 with no lateral shifting above the links 48 and 50, the load on the spring 42 will be increased whereas the load on the spring 44 will be decreased and the saddle 46 will approach the angularly inclined dotted line position 70. This movement of the support member or saddle 46 above the springs into the dotted line inclined position results in a lateral displacement $m$ of the center of gravity 72 of the superstructure 56.

The lateral or centrifugal force 68 to which the vehicle is subjected results further in a shifting of the superstructure on the links 48 and 50. The upper end 58 of the link 48 rides outwardly to elevate the outside of the body, and the upper end 60 of the link 50 moves in the same direction but lowers the other side of the body thereby moving the superstructure to an inclined or banked position towards the inside of the curve.

This movement of the body to the banked position is accompanied by a lateral and downward movement of the center of gravity from the point 74 to the point 76. This lateral movement, when added to the lateral movement $m$ of the superstructure above the springs from the point 72 to the point 74 results in an undesirable lateral movement which materially reduces the safety of the vehicle when driving around curves.

The embodiment of the invention illustrated in Figure 3 embodies much of the structure illustrated in Figure 2. Corresponding parts have therefore been given corresponding reference numerals with the addition of 100. The rod 166 may be connected to an arm 180 carried by the link 148 rather than being connected to the member or saddle 146 carried by the springs 142 and 144 as illustrated in Figure 2.

When the rod 166 is thus connected to the link 148 the upper part of the link 148 between the arm 180 and the connection 158 to the superstructure 156 moves outwardly in the direction of the force 168 whereas the portion of the link 148 between the arm 180 and the connection 152 to the saddle 146 moves laterally inwardly against the direction of the force 168, thereby shifting the member or saddle 146 against the direction of the force 168 to compensate the normal lateral shifting of the superstructure above the springs as illustrated at $m$ of Figure 2 and representing the distance between 72 and 74 thereof. The upper ends of the springs 142 and 144 may readily be shifted laterally as illustrated in Figure 3 because such springs can be arranged in such a manner, for instance by rubber mountings, that they have relatively little resistance to displacement perpendicular to their longitudinal axes.

The movement of the superstructure 156 under the influence of the force 168 results now only in lateral and downward movement of the center of gravity 170 of the superstructure 156 on the links 148 and 150 from the point 172 to the point 176. The return of the superstructure 156 and all operative supporting members between the superstructure and wheel supporting means 140 will be induced by means of the precompressed resilient bushings 157 and 159 respectively.

The embodiment of the invention illustrated in Figure 4 includes wheel supporting means or axles 201 having wheels 203. The axle or wheel supporting means 201 is provided with shackles 205 which support resilient means such for example as a transverse leaf spring 207. A saddle 209 carried by the springs is pivotally connected with the pivot axes longitudinally of the vehicle to angularly inclined links 211 and 213 at 212 and 214. These links are pivotally connected to a superstructure or body 215 at 216 and 218 with the axes of the pivots extending longitudinally of the vehicle in such a manner that the body may shift laterally under the influence of centrifugal forces indicated by the arrow 221 towards the outside of the curve and assume an inclined or banked position towards the inside of the curve because the link 211 elevates the side of the vehicle on the outside of the curve and the link 213 lowers the side of the vehicle on the inside of the curve.

Means may be provided to counteract lateral displacement of the superstructure relative to the wheel supporting means above the resilient means. One desirable form of compensating this undesirable lateral displacement comprises a rod 217 interposed between a portion 219 of the axle or wheel supporting means 201 adjacent the wheel 203 and the angularly inclined link 211 intermediate its length by means of pivots having their axes extending longitudinally of the vehicle.

In the operation of this embodiment of the invention, if the superstructure 215 is subjected to a force in the direction of the arrow 221, the superstructure will shift laterally on the links 211 and 213 about the lower pivots 212 and 214 and about the upper pivots 216 and 218 towards the outside of the curve to assume an angularly inclined position towards the inside of the curve. The rod 217 pivotally connected between the portion 219 of the axle 201 at 202 adjacent the wheel 203 and the link 211 at 223 guides the portion of the link 211 below the pivot point 223 of the connection thereto to move angularly inwardly against the force indicated by the character 221 whereas the portion of the link 211 above the connecting point 223 will move angularly in the direction of the force 221. So long as the point of connection 223 is slightly below the middle point of the link 211 the resultant force will be a movement of the center of gravity of the superstructure 215 in the direction of the force 221. This angular turning of the lower portion of the link 211 about the pivot 223 against the force 221 results in a lateral movement of the saddle 209 and spring 207 against the direction of the force 221 as illustrated in dotted lines. This dotted line position takes into consideration the deflection of the leaf spring 207 also.

The lateral shifting of the superstructure 215 relative to the wheels 203 is thus materially reduced as illustrated diagrammatically by the lines 231 and 233, the lines 233 representing the spaces required between the wheels 203 to accommodate the lateral displacement of the superstructure before the redistribution or partial compensation of the lateral movement of the center of gravity of the superstructure, and the lines 231 representing the space required to accommodate the lateral displacement of the superstructure relative to the wheels when the center of gravity is redisplaced according to this invention.

The effect of redisplacing the center of gravity of the body to compensate lateral movement of the superstructure or body above the springs results in increased safety also. The effective result is equivalent to increasing the tread width of the wheels the double amount equal to the redistribution of the center of gravity as illustrated by the lines 235 of Figure 4.

The embodiment illustrated in Figure 5 includes wheel supporting means 241 and a superstructure diagrammatically illustrated at 243. Generally longitudinally extending rods 245 and 247 may be interconnected between the superstructure by means of ball and socket joints 246 and 248 at the superstructure and to the wheel supporting means 241 by means of ball and socket joints 250 and 252 respectively. The rods 245 and 247 are each provided with longitudinal extensions 249 and 251 respectively projecting beyond the wheel supporting means 241. These projections 249 and 251 form the supports for suitable resilient means such for example as springs 253 and 255. A spring saddle 257 having outwardly and upwardly extending arms 259 and 261 is provided to engage the springs 253 and 255. The spring saddle 257 is pivotally connected with angularly inclined links 263 and 265 which are pivotally connected at their upper ends to the superstructure 243.

If the vehicle is subjected to lateral force such for example as in the direction of the arrow 267 the superstructure 243 shifts laterally on the links 263 and 265 to assume an angularly inclined position. This lateral movement of the superstructure 243 results in a lateral shifting of the generally longitudinally extending members 245 and 247 with their ball and socket joints 246 and 248 together with the superstructure in the direction of the force 267. The members 245 and 247 being also connected at 250 and 252 to the wheel supporting means 241 results in movement of the extensions 249 and 251 against the direction of the force 267. The extensions 249 and 251 carry the springs 253 and 255 which in turn support the saddle 257. These members 249, 251, 253, 255, 257 and the lower portions of the links 263 and 265 move against the direction of the force 267 towards the inside of the curve, decreasing the lateral shifting of the superstructure relative to the wheel supporting means. Since the pivots 246 and 248 and the upper pivots 264 and 266 of the links 263 and 265 are connected to the same rigid frame member of the superstructure 243, no lateral shifting of one pair of connections is possible without a simultaneous lateral shifting of the other pair of pivot connections. The spring carrying extensions 249 and 251 are therefore also controlled by the lateral shifting of the superstructure, which in turn is controlled by resilient means employed to yieldingly urge the superstructure toward an upright position as illustrated in Kolbe Patent No. 2,226,435 and, Serial No. 279,845, filed June 19, 1939, Patent No. 2,271,505, Jan. 27, 1942. The horizontal displacement of the superstructure 243 is controlled by said spring and all vertical displacement is controlled by the links 263 and 265 and the springs 253 and 255. The centrifugal force acting on the superstructure 243 will therefore not be transmitted to the saddle 257.

A rod 271 interconnecting the wheel supporting means 241 and the superstructure 243 in a plane different than the rods 245 and 247 is provided to cooperate in the transmission of brake and torque forces from the wheels to the superstructure.

Figure 7 is a perspective view of a complete vehicle embodying the front and rear running gear and superstructure mounting arrangements illustrated in Figures 4 and 5, submitted in an effort to more fully disclose the invention since all of the constructive parts actuated by movements of the superstructure are not disclosed in Figures 4 and 5. Parts of the vehicle illustrated in Figure 7 corresponding to the respective parts of Figures 4 and 5 have therefore been given corresponding reference numerals.

It will be noted that the rigid front axle 201 is operably connected to the superstructure 215 by means of laterally spaced generally longitudinally extending rods 220 and 222 connected to the axle 201 by ball and socket joints 224 and 226 and connected to the superstructure by ball and socket joints 228 and 230. Auxiliary longitudinally extending rods 232 and 234 preferably positioned in a different vertical plane than the rods 220 and 222 may be provided to interconnect the axle and the superstructure to cooperate with the rods 220 and 222 in the transmission of brake and torque forces to and from the wheels. The rods 232 and 234 are connected to the axle by ball and socket joints 236 and 238 operably connected to the axle through vertically spaced arms 240 and 242 respectively. The rods 232 and 234 are connected to the superstructure by ball and socket joints 244 and 254.

The rods 220 and 232 are provided with laterally extending arms 256 and 258 respectively. Referring to the rear portion of the vehicle, it will be noted that the rod 247 is provided with an arm 260 extending laterally in the opposite direction to the arms 256 and 258 at the front of the vehicle. The arm 260 at the rear is operably connected with the arms 256 and 258 at the front by means of a longitudinally extending rod 262 connected by means of ball and socket joints 272 to the arm 260 at the rear and by ball and socket joints 274 and 276 with the arms 256 and 258 respectively at the front.

A bracket 278 carried by the superstructure is provided with a pair of forwardly and rearwardly spaced abutments 280 and 282 respectively adapted to be engaged by a spring 284 operably connected to the rod 262 to exert on the rod 262 a force tending to yieldingly urge the superstructure 215 toward a normal or substantially upright position. The details of the connection of the spring 284 with the rod 262 and the bracket 278 is now clearly disclosed in my copending application Serial No. 374,872, filed January 17, 1941.

Figure 8 illustrates the same vehicle which is depicted in Figure 7 showing a superstructure in the angularly inclined or banked position to more clearly illustrate the relation of the various operating members hereinbefore described. The same reference characters have therefore been added to the corresponding portions of Figure 8.

Figure 6 discloses a somewhat modified form of the invention wherein all of the road engaging wheels are movable independently and wherein means are provided to compensate lateral displacement of the superstructure towards the outside of the curve by providing novel means to move the body supporting members against the force exerted on the vehicle as it rounds a curve.

It will be observed that the body or superstructure 310 having a rear mounted engine 371 is provided with independently movable front and rear wheels. The front or steerable wheels 312 are carried by a pair of spindles 316 which are formed integrally with brackets 318. These brackets are connected by means of ball and socket joints 320 and 322 to generally transversely extending members 324 and 326. The member 324 is connected by means of ball and socket joints 340 to paired generally longitudinally extending transversely spaced rods 338 which are by means of ball and socket joints 342 connected to the superstructure 310. The member 326 is by means of ball and socket joints 346 connected to paired generally longitudinally extending transversely spaced rods 344 which are in turn connected by ball and socket joints 348 with the superstructure 310.

Suitable resilient means such for example as springs 328 carried by the member 324 may be provided to absorb vertical shocks to which the wheels 312 are subjected. Suitable supporting means such for example as the generally transversely extending member 330 is provided to engage the springs 328 and to support paired angularly inclined links 332 pivotally connected with the pivot axis in the longitudinal direction of the vehicle to the member 330 at 334. The links 332 are likewise pivotally connected to the superstructure at 336 in such a manner that the superstructure 310 may shift transversely under the influence of lateral forces to assume an inclined or banked position, guided mainly by the links 332 which turn about their pivotal connections 334 as well as 336.

Rear or driving wheels 314 independently movably mounted on generally transversely extending members 350 and 351 by means of hinges 353 and 355 respectively whose axes extend longitudinally of the vehicle are provided. The member 350 is connected by means of ball and socket joints 368 to paired transversely spaced generally longitudinally extending rods 366 which are connected to the superstructure 310 by means of ball and socket joints 370. The member 351 is connected by means of ball and socket joints 376 to paired transversely spaced generally longitudinally extending rods 372, which in turn are connected to the superstructure 310 by means of ball and socket joints 374.

The generally longitudinally extending rods 338 and 344 at the front of the vehicle may be connected with the generally longitudinally extending rods 366 and 372 at the rear of the vehicle to maintain the front and rear wheels in proper alignment. Means associated with these connecting means between front and rear of the vehicle may be provided to induce the wheels to assume an angularly inclined position towards the inside of the curve as the vehicle is subjected to centrifugal force.

One desirable form of such means includes arms 380 and 382 carried by the rods 338 and 344 at the front, and arms 384 and 385 carried by the rods 366 and 372 respectively at the rear of the vehicle. The relation between the length of the front arms 380 and 382 may, as illustrated, be such that when connected to the generally longitudinally movable bar 378 by means of ball and socket joints 386 and 388 and thus interconnected with the arms 384 and 385 in the rear of the vehicle by means of ball and socket joints 390 and 391, the generally transversely extending front and rear wheel supporting means 326 and 351 respectively may be moved transversely relative to the supporting means 324 and 350, so as to guide the wheels in an angular position towards the inside of the curve. If desired, the front rods 338 and 344 and the arms 380 and 382 may be formed as bell cranks, and the rear rods 366 and 372 and the arms 384 and 385 may also be formed as bell cranks. These bell cranks may be proportioned in such a manner as to only prevent the wheels from assuming an angular position towards the outside of the curve rather than moving them to an angular position towards the inside of the curve. Suitable means such for example as a spring 392 may be placed between the bracket arms 394 and 396 of the superstructure 310, and two shoulders 398 and 399 with which the longitudinally movable member 378 is provided may be arranged in such a manner as to yieldingly urge the member 378 towards a substantially predetermined normal position to maintain the superstructure 310 in the substantially upright position.

Means may be provided to compensate a portion of the lateral displacement of the superstructure relative to the wheel supporting means. In one illustrative form of compensating means one of the pairs of the rear longitudinally extending rods 366 or 372 may be extended beyond the wheel supporting means as illustrated by the arms 600. The arms 600 may serve as supports for suitable resilient means such for example as springs 356 to absorb vertical shock to which the wheels 314 are subjected. A spring saddle or support member 358 may engage the springs 356 and receive paired angularly inclined links 360 connected by means of pivots 362 whose axes extend longitudinally of the vehicle to the saddle member 358 at one end and connected at the other end to the superstructure 310 by means of pivots 364 in the same manner.

One of the front longitudinally extending rods 338 may be extended beyond the wheel supporting means as illustrated by the arm 602 carried by the rod 338. The arm 602 may be connected by means of a ball and socket joint 604 to a generally transversely extending rod 606 which in turn is connected by means of a hinge 608 to one of the angularly inclined links 332 at a point thereof preferably below the center of the link 332.

In the operation of this device, as the superstructure is subjected to lateral forces as when rounding a curve, it shifts laterally on the front and rear links 332 and 360 in the direction of centrifugal force to assume an inclined or banked position towards the inside of the curve. The front arm 602 and the rear arms 600 are moved laterally towards the inside of the curve as the front and rear longitudinally extending rods 338 and 366 respectively and especially with their connections 332 and 370 move with the lower part of the superstructure towards the outside of the curve. As the front arm 602 and especially the joint 604 moves towards the inside of the curve the generally transversely extending rod 606 connected to one of the links 332 moves itself together with the lower part of the link 332 towards the inside of the curve thereby moving the support means 330 towards the inside of the curve and compensating a portion of the lateral displacement of the superstructure towards the outside of the curve. This inward movement of the support means 330 towards the inside of the curve may compensate lateral shifting of the superstructure above the springs, and may even compensate a portion of the lateral shifting of the superstructure on the supporting links 332 and 360 respectively.

The arms 600 on the rear of the vehicle also move towards the inside of the curve thereby shifting the springs 356 and the supporting means or saddle 358 towards the inside of the curve to compensate lateral movement of the center of gravity of the superstructure towards the outside of the curve.

The engine 371 is operably connected to drive a differential 352 having transversely extending slidable axle arms 377 operably connected to the axle members 375 operably connected to drive the wheels 314. A rear placed engine is considered favorable but not characteristic for the arrangement disclosed in this invention.

It will be understood that the front and rear wheel supporting members may take any desired form, such for example as rigid axles or any other type of wheel supporting members to which the longitudinally extending rods may be pivotally connected to embody in the device the means for compensating lateral displacement of the superstructure.

Attention may be called to the fact that because of the decrease in lateral displacement of the frame of the superstructure relative to the wheel supporting means, the generally longitudinally extending members interconnecting the wheel supporting means and superstructure such for example as 338, 344 of Figure 6 can be shorter than would otherwise be required. As these generally longitudinally extending members are decreased in length, they can be made lighter than would be required if they were longer, to withstand the load to which they are subjected.

In the various embodiments of the invention disclosed herein, the superstructure of the vehicle will assume an angularly inclined or banked position towards the inside of the curve. This movement to a banked position is preferably accompanied by a lateral displacement of the superstructure towards the outside of the curve or in the direction of the centrifugal force. The centrifugal force developed as the vehicle rounds a curve is employed to move the superstructure to the banked or angularly inclined position. It is therefore unnecessary to use any additional source of power to move the superstructure to the banked position.

I claim:

1. In a vehicle having wheel supporting means, road engaging wheels carried by said wheel supporting means, a superstructure, resilient means associated with the wheel supporting means to absorb vertical shock to which the wheels are subjected, a member carried by the resilient means, paired angularly inclined links between said member and superstructure whereby the superstructure may shift laterally relative to the wheel supporting means and assume an angularly inclined or banked position relative to the wheel supporting means under the influence of lateral forces as the vehicle rounds a curve, and means comprising a generally transversely extending member connecting the wheel supporting means and one of said links to cause movement of the member carried by the resilient means laterally against the direction of the lateral force to limit lateral shifting of the superstructure on the resilient means as the vehicle rounds a curve.

2. In a motor vehicle having wheel supported members, a superstructure, substantially vertically disposed connecting means between the superstructure and wheel supported members so constructed and arranged that the superstructure may assume an angularly inclined or banked position under the influence of lateral force accompanied by a lateral shifting of the superstructure in the direction of the lateral forces, and transversely movable means between the substantially vertically disposed connecting means and the wheel supported members to partially compensate the lateral shifting of the superstructure on the substantially vertically disposed connecting means.

3. In a motor vehicle having wheel supported members, a superstructure, connecting means including resilient means between the wheel supported members and superstructure whereby the superstructure may shift laterally on the resilient means under the influence of lateral forces as the vehicle rounds a curve, support means between the resilient means and the wheel supported members, and means operable by lateral movement of the superstructure to shift the support means for the resilient means laterally against said forces to at least partially compensate said lateral shifting.

4. In a motor vehicle having wheel supported members, a superstructure, resilient means associated with the wheel supported members to absorb vertical shocks to which the wheels are subjected, a support carried by the resilient means, linkage means between said support and superstructure whereby the superstructure may shift laterally relative to the wheel supported members and assume an angularly inclined or banked position under the influence of lateral forces as the vehicle rounds a curve, and means associated with the wheel supported members and said linkage means to guide said support laterally against the direction of the lateral force to limit said lateral shifting of the superstructure relative to the wheel supporting means.

5. In a motor vehicle having wheel supported members, a superstructure, generally longitudinally extending angularly movable connecting means between the superstructure and wheel supported members, longitudinally extending arms carried by said connecting means and projecting beyond the wheel supported members, resilient means carried by said arms, a support member carried by the resilient means, and linkage means between said support member and the superstructure whereby the superstructure may shift laterally and assume an angularly inclined or banked position under the influence of centrifugal forces as the vehicle rounds a curve and said longitudinally extending arms may shift the resilient means laterally against the direction of the centrifugal force to partially compensate lateral shifting of the superstructure relative to the wheel supporting means.

6. In a vehicle having wheel supported members, a superstructure, generally longitudinally extending connecting means pivotally connected to the wheel supported members and to the superstructure, resilient means interposed between the longitudinally extending connecting means and superstructure to absorb vertical shock to which the wheels are subjected, substantially vertically extending linkage means between the resilient means and the superstructure, said longitudinally extending connecting means being so constructed and arranged that as the superstructure shifts laterally in the direction of the centrifugal force as the vehicle rounds a curve the movement of the generally longitudinally extending connecting means shifts said resilient means laterally against the direction of centrifugal force to compensate the lateral shifting of the superstructure due to deflection of the resilient means.

7. A vehicle comprising wheel supported members, a superstructure, resilient means associated with the wheel supported members to absorb vertical impulses to which the wheels are subjected, generally vertically disposed means for connecting the resilient means and superstructure, and generally horizontally extending means connecting the wheel supported members and vertically disposed means and operable upon movement of the superstructure laterally in one direction relative to the wheel supported members to move said generally vertically disposed connecting means to limit said lateral movement of the superstructure.

8. In a vehicle having wheel supporting means, a superstructure, connecting means comprising resiliently mounted links between the superstructure and wheel supporting means whereby the superstructure may shift laterally towards the outside of a curve and assume an angularly inclined or banked position relative to the wheel supporting means when subjected to lateral forces, and generally horizontally extending means associated with said connecting means and operated by lateral movement of the superstructure to move the superstructure against the direction of the lateral force as it assumes said angularly inclined or banked position to reduce the resultant lateral movement of the superstructure in the direction of the lateral force.

9. In a vehicle having wheel supporting means, road engaging wheels carried by the wheel supporting means, a superstructure, connecting means including front and rear linkages and resilient means between the wheel supporting means and superstructure whereby the center of gravity of the superstructure has a tendency to shift laterally towards the outside of the curve under the influence of lateral forces as the vehicle rounds a curve, and means interposed between the wheel supporting means and said connecting means and operable by said lateral forces to at least partially compensate said lateral shifting of the superstructure relative to the wheel supporting means as the vehicle rounds a curve.

10. In a vehicle having front and rear wheel supporting means, road engaging wheels carried by the wheel supporting means, a superstructure, generally longitudinally extending angularly movable connecting means between the superstructure and wheel supporting means, arms carried by said connecting means and extending beyond the wheel supporting means, resilient means carried by said arms, a support member carried by said resilient means, and connecting means between said support member and the superstructure comprising paired angularly inclined links whereby the superstructure may shift laterally and assume an angularly inclined or banked position under the influence of centrifugal forces as the vehicle rounds a curve, and said arms may shift the resilient means laterally against the direction of the centrifugal force to partially compensate lateral shifting of the superstructure relative to the wheel supporting means.

11. A vehicle comprising wheel supported members, a superstructure, generally longitudinally extending connecting means between the wheel supported members and the superstructure, resilient means including springs carried by the wheel supported members to absorb vertical shock to which the wheels are subjected, a cradle carried by the springs, connecting means comprising angularly inclined links between the cradle and the superstructure whereby the superstructure may shift laterally relative to the wheel supported members and assume an angularly inclined or banked position under the influence of lateral forces as the vehicle rounds a curve, an arm carried by said generally longitudinally extending connecting means and movable laterally in the opposite direction as the superstructure shifts laterally relative to the wheel supported members, and means interconnecting said arm and one of said links to shift the cradle laterally against the centrifugal force to compensate a portion of said lateral movement of the superstructure relative to the wheel supported members as said arm is moved laterally.

12. A motor vehicle comprising a running gear including wheel supported members, transversely extending connecting means between said wheel supported members, a superstructure, generally longitudinally extending linkage means pivotally connected adjacent one of their ends to the superstructure and pivotally connected intermediate their ends to said transversely extending connecting means, resilient means carried adjacent the free ends of said linkage means, generally vertically extending connecting means for supporting the superstructure on the resilient means whereby the superstructure under the influence of lateral forces developed as the vehicle rounds a curve may shift laterally relative to said wheel supported members in the direction of said forces and assume an angularly inclined or banked position towards the inside of the curve, said longitudinally extending connecting means being so constructed and arranged as to shift the resilient means laterally towards the inside of the curve to partially compensate lateral movement of the superstructure towards the outside of the curve.

13. A motor vehicle comprising front and rear running gears including wheel supported members, a superstructure, generally longitudinally extending linkage means pivotally connected to the superstructure and to the running gears, resilient means carried by the longitudinally extending linkage means, a support for the springs, generally vertically extending linkage means between the support for the springs and the superstructure whereby the superstructure may shift laterally relative to the running gears and assume an angularly inclined position under the influence of lateral forces, said longitudinally and vertically disposed linkage means being so constructed and arranged that as the superstructure moves laterally outwardly to a position inclined to the center of the curve the springs and all parts supported thereby move laterally against the centrifugal force to partially compensate lateral displacement of the center of gravity above said resilient means.

14. In a motor vehicle, a running gear including wheel supported members, transversely extending connecting means between said wheel-supported members, a superstructure, front and rear longitudinally-extending connecting means universally connected to the superstructure and to the transversely-extending connecting means, the longitudinally-extending connecting means having extensions projecting beyond the transversely-extending connecting means, resilient means supported by said extensions, a support carried by the resilient means, angularly movable connecting means between said support for the resilient means and the superstructure whereby the superstructure under the influence of lateral forces developed as the vehicle rounds a curve may shift laterally relative to said wheel-supported members in the direction of said forces and assume an angularly-inclined or banked position towards the inside of the curve and the resilient means may shift laterally against the direction of said forces, a longitudinally movable member interconnecting said front and rear longitudinally-extending connecting means and so constructed and arranged as to insure substantially uniform lateral movement of the front and rear wheel-supported members as the superstructure assumes a banked position.

JOACHIM KOLBE.